July 29, 1947.                    W. M. CROOK                    2,424,878
METHOD OF BONDING A LINER WITHIN A BORE
Filed Oct. 28, 1944                      2 Sheets-Sheet 1
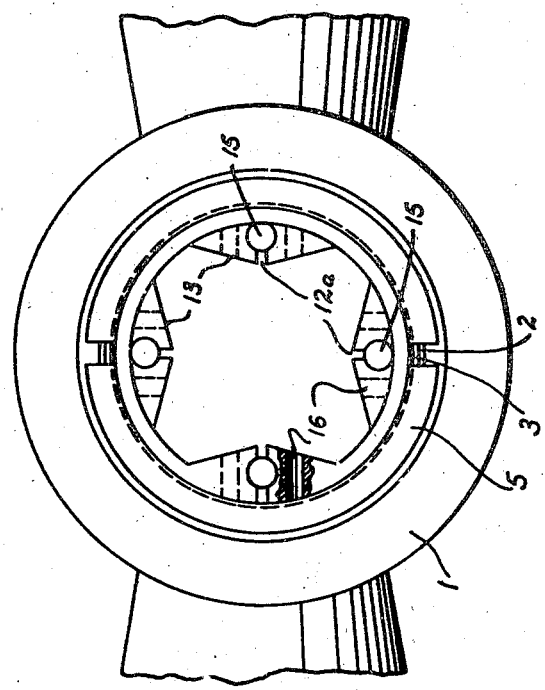
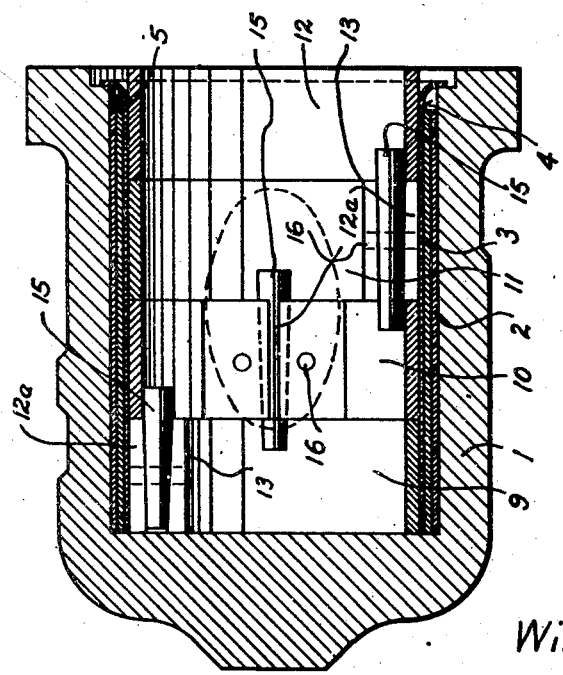
William M. Crook
INVENTOR
BY
ATTORNEYS July 29, 1947.  W. M. CROOK  2,424,878
METHOD OF BONDING A LINER WITHIN A BORE
Filed Oct. 28, 1944  2 Sheets-Sheet 2
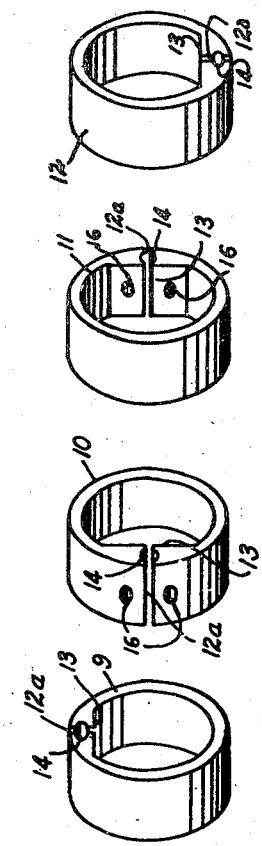
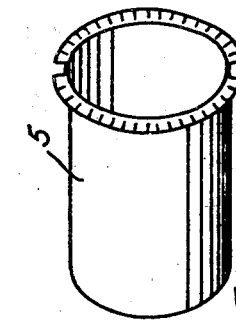
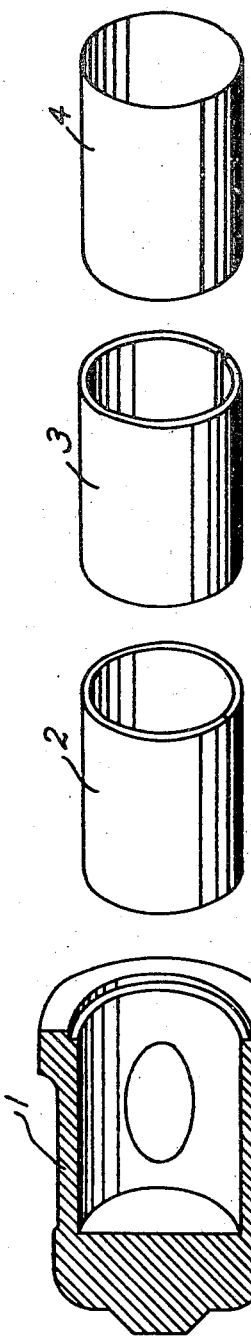
William M. Crook.
INVENTOR
BY
ATTORNEYS.

Patented July 29, 1947

2,424,878

UNITED STATES PATENT OFFICE 2,424,878

METHOD OF BONDING A LINER WITHIN A BORE

William M. Crook, Houston, Tex., assignor to Reed Roller Bit Company, Houston, Tex., a corporation of Texas Application October 28, 1944, Serial No. 560,889

2 Claims. (Cl. 154—82)

This invention relates to an improved method of joining a flexible material rigidly and in a pressure-tight manner to the inner or outer surface of the wall of a vessel having a relatively heavier wall thickness.

In previous practice of the art, dependence for close fit of the two parts to be joined has been on careful machining of each piece to secure an exact fit of the proper tightness, or on the use of mechanically actuated tools or fixtures. Where a change of temperature is involved in the joining process, original fits between dissimilar metals change, and mechanically operated devices require continual adjustment.

As a result, the lining or coating of the walls of such vessels has been accomplished in many cases by welding with the desired coating material over the entire surface to be coated, and then machining the coating so deposited, an expensive and undesirable process.

An object of this invention is to provide an improved method of bonding flexible linings within bores or coverings upon the exteriors of bodies of rigid material.

Another object of this invention is to provide a method of thermal bonding in which the differential expansion of rigid members having different coefficients of thermal expansion is utilized to press the parts to be joined together.

Still another object of this invention is to provide a method of thermally bonding a flexible lining within a bore of a rigid member in which an expanding member is inserted within the lining and is formed of a material having a coefficient of thermal expansion greater than that of the rigid member whereby upon heating the assembly to bond the lining to the rigid member the lining will be pressed tightly against said rigid member.

A still further object of this invention is to provide a method of bonding a flexible lining within the bore of a rigid member which involves insertion of the lining within the bore with bonding material between the adjacent surfaces of the lining and the bore, insertion of a shim within the lining and the positioning of mechanically adjustable expansion members within the shim, said members being formed of a material having a greater coefficient of thermal expansion than the rigid member whereby upon application of heat to the bond the lining will be pressed tightly against the bore in the rigid member.

With these and other objects in view, the present invention resides in the parts and combinations and the steps and procedures hereinafter described and illustrated in the drawings.

In the drawings:

Fig. 1 is an axial sectional view of a hollow casing into which a flexible lining is to be bonded in accordance with the procedure of the present invention, with the equipment for pressing the lining against the bore in the casing arranged in position.

Fig. 2 is a plan view of the hollow casing of Fig. 1.

Fig. 3 is a view of the hollow casing similar to Fig. 1 but in perspective and with the lining and other parts removed therefrom.

Fig. 4 is a perspective view of a tube of bonding material employed in carrying out the present invention.

Fig. 5 is a perspective view of a liner to be bonded within the hollow casing of Fig. 1.

Fig. 6 is a perspective view of a tube of carbon paper adapted to be inserted within the liner of Fig. 5.

Fig. 7 is a perspective view of a tubular shim adapted to be positioned in the liner of Fig. 5 with the carbon paper shown in Fig. 6 interposed between the same.

Figs. 8, 9, 10, and 11 are perspective views of identical expander rings employed in carrying out the illustrated manner of practicing the present invention.

While the present invention is suitable for securing a flexible lining in a bore in or a covering or coating on the outside surface of a rigid body, for purposes of illustration it has been indicated in the accompanying drawings as applied to the securing of a thin flexible lining within the bore of a hollow body or casing. Such a lining may be secured in place in the bore of the body by bonding the lining to the wall of the body with a suitable bonding material which is melted. According to the present invention prior to melting of the bonding material the lining, bonding material and expanders are assembled in place.

In assembling the lining and expanding equipment in the bore of the body 1 a thin sheet of a brazing alloy in the form of a tube 2 is inserted within the bore. Within the tubular sheet of brazing alloy is inserted the lining 3 which is of flexible sheet metal in tubular form. These three parts are cleaned and treated with a flux suitable for assisting in the bonding of the lining 3 to the wall of the body 1 by the brazing material 2 when melted. After cleaning these three parts are assembled as shown in Figs. 1 and 2 of the drawing.

In cleaning and fluxing the parts to be bonded it is of course necessary to clean and flux both sides of the sheet of brazing material but it is necessary to clean and flux only one surface of the liner and the single surface of the wall of the bore in the rigid member 1.

When the lining and bonding material are assembled in position in the bore of body 1 a sheet of carbon paper 4 is inserted in place within the lining 3 and a shim 5 in the form of a tube is inserted within the carbon paper tube. The carbon paper 4 and the shim may be assembled together before insertion in the lining tube. While reference has been made to the elements 2, 3, 4 and 5 being tubes, they may be and are illustrated as sheets bent to tube-like form. Also, while reference has been made to assembling the parts in the order mentioned, the lining 3, bond 2, carbon paper 4 and shim 5 in sheet form may be assembled and while assembled rolled into tubular form and positioned in the bore of the body 1.

After the assembly of lining, bonding material, carbon paper and shim has been placed within the bore of the body 1, a clamping means in the form of one or more expander members is positioned within the same. While it is preferable to assemble the sheet material within the bore of the body 1 prior to positioning of the expander members therein, it is also within the concept of the present invention to wrap one or more of the tubular sheet-like members 2, or 4 about the expander members or mandrels prior to insertion of the latter within the bore.

Although a single clamping member may be employed to carry out the present invention, it is preferable to use a plurality of such members constructed to best suit the particular device to which the lining of coating is to be bonded. In the case of inserting a lining of thin flexible material within a valve body as illustrated in the drawings, it has been found advisable to provide several substantially identical expander members side by side. This is desirable because it makes for ease and accuracy of placement, interchangeability, and simplicity in manufacture, as well as efficiency in the provision of even clamping of the liner. There is first of all inserted within the bore of the body 1 in succession, the expander members 9, 10, 11 and 12. The first such member 9, as shown, rests against and is positioned by the bottom of the bore, and each of the other members 10, 11 and 12 rests in turn against and is positioned by the next preceding member in the series.

Each of the expander rings or mandrels 9, 10, 11 and 12 is of tubular or ring-like form and is provided with a slotted portion 12a. At the slotted portion each of the rings is built up to provide a boss 13 through which extends a tapered bore 14 with its axis substantially parallel to the axis of the ring. After assemblage of the expander rings or mandrels 9, 10, 11 and 12 within the shim 5 tapered pins 15 are inserted within the tapered bores 14 and driven in position to expand the several rings against the shim and in turn press the lining 3 and bonding material 2 tightly against the wall of the bore in the body 1. In place of the tapered pins 5 screws or other elements capable of spreading apart the ends of the expander rings may be employed. By employing a plurality of expander rings as illustrated in Fig. 1 of the drawings, a more or less uniform pressure may be exerted against the lining and bonding material to press the same against the wall of the bore in the body 1.

It is to be noted that in placing the rings 9, 10, 11 and 12 in position the tapered bores 14 of the several rings are staggered with respect to each other. It will also be noted that the tapered bores carried by the slotted portions of the rings lie well within the inner periphery of the rings so that the pins 15 of any of the rings may be inserted, removed or adjusted without disturbing the other rings.

One of the principal features of the present invention resides in the fact that the expander rings are constructed of a material which has a higher thermal coefficient of expansion than the body 1. Under these circumstances after the assemblage of the brazing alloy, liner, carbon paper, shim and expander rings are placed in the bore of body 1 and mechanically tightened, heating of the assemblage will cause the expander rings to expand at a greater rate than the body 1 and will more and more tightly press the lining and bonding material against the wall of the bore in the body 1. As the temperature is continually raised until the brazing alloy melts there is a continual increase in the pressure between the liner and the wall of the bore which tends to more securely bond the liner to the wall of the bore and cause the bonding material to flow into all crevices thereby securing a highly effective bond.

After the bonding has been effected and the parts allowed to cool, the expander rings will contract more than the body 1 and the assemblage will become loosened to such an extent that the shim and expander rings may be easily removed.

When employing bonding or joining medium requiring that the temperature be raised as for instance the brazing alloy employed in the foregoing description, the expander ring or rings are constructed of a material having a higher coefficient of expansion than that of the heavy rigid member being lined. Under these circumstances the assembly is initially tight and the increase of temperature increases the tightness and provides an adjustable tight fit which compensates for the melting or flowing of the bonding material within the joint. For bonding a liner in a heavy body with a bonding material requiring a lowering of temperature, the expander ring or rings should then be made of a material having a lower coefficient of expansion than the heavy rigid member in the bore of which the lining is to be joined.

In joining a coating to the exterior of a rigid body, it will be appreciated that clamping bands would be employed, and that such bands would be of a material having a lower coefficient of expansion than the rigid body in cases where the temperature is increased to effect the bonding, and vice versa.

The method of the present invention may be employed to join metal to metal with brazing alloy, solder or other adhesives; metal to plastic with proper adhesives; plastic to plastic with proper adhesives. The materials out of which the expanders are constructed are in each case determined by the coefficient of expansion of the materials involved. In the case illustrated the body was of iron or steel, the sheet metal liner of stainless steel, copper nickel alloy, brass or bronze, the brazing alloy a silver solder alloy, and the expander ring or rings of austenitic material such as 18–8 stainless steel corrosion resistant cast iron.

The shim 5 serves to facilitate the insertion of the expander rings within the assemblage and prevents the expander rings damaging the carbon paper or the liner to be bonded within the bore of the rigid member. The carbon paper serves to prevent bonding of the liner to the shim when the bonding material flows.

It will be appreciated that many modifications and variations may be employed in carrying out the present invention including substitution of materials and arrangement of parts.

From the foregoing description it will be appreciated that the present invention provides a simple and effective method for the bonding of a flexible lining within a bore in or a coating or covering on the exterior of a solid member. It is, of course, within the concept of the present invention to utilize the principles of the present invention for bonding sheet metal to rigid members under circumstances in which use of clamping members having a different coefficient of expansion than the rigid member is possible.

Having described my invention, I claim:

1. A method of bonding a flexible lining in a bore in a rigid body comprising assembling sheets of bonding material and lining material in the bore, placing a shim over the surface of the lining, placing an expander bottom member in the bore against the bottom of the latter, placing more than two identical mechanically adjustable expander members in the bore, adjusting the expander members individually against the shim to press the sheet of bonding material against the wall of the bore and the lining against the bonding material, said expander members having a higher coefficient of thermal expansion than the body, and heating the assemblage to fuse the bonding material and to cause the lining to be pressed against the wall of the bore by the differential thermal expansion of the body and expander members.

2. A method of bonding a flexible lining in a bore of a rigid member comprising the steps of assembling the lining within the bore with a layer of separate bonding material therebetween, placing an expander within the liner, said expander having a greater co-efficient of thermal expansion than does the rigid member and heating the assembly to fuse the bonding material and to cause the lining to be pressed against the wall of the bore by the differential thermal expansion of the rigid member and expander.

WILLIAM M. CROOK.

REFERENCES CITED

The following references are of record in the file of this patent:

UNITED STATES PATENTS

| Number | Name | Date |
| --- | --- | --- |
| 2,397,308 | Barnes | Mar. 26, 1946 |
| 1,840,724 | Koehring | Jan. 12, 1932 |
| 366,271 | Stevenson | July 12, 1887 |
| 895,412 | Badger | Aug. 11, 1908 |
| 2,129,125 | Geyer | Sept. 6, 1938 |
| 1,971,433 | Tartrais | Aug. 28, 1934 |
| 2,223,648 | Wachowitz | Dec. 3, 1940 |
| 2,366,164 | Weick et al. | Jan. 2, 1945 |